(12) United States Patent
 Okamura

(10) Patent No.: US 9,985,440 B1
(45) Date of Patent: May 29, 2018

(54) BALANCING AN ELECTRICAL LOAD, ASSOCIATED WITH POWER SUPPLY MODULES OF AN N+A POWER SUPPLY SYSTEM, BETWEEN POWER SOURCES

(71) Applicant: Juniper Networks, Inc., Sunnyvale, CA (US)

(72) Inventor: Katsuhiro Okamura, Watsonville, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 247 days.

(21) Appl. No.: 14/849,115

(22) Filed: Sep. 9, 2015

(51) Int. Cl.
 *H02J 5/00* (2016.01)
 *G05F 1/66* (2006.01)

(52) U.S. Cl.
 CPC .  *H02J 5/00* (2013.01); *G05F 1/66* (2013.01)

(58) Field of Classification Search
 None
 See application file for complete search history.

(56) References Cited

U.S. PATENT DOCUMENTS

| | | | |
|---|---|---|---|
| 8,742,624 B1* | 6/2014 | Sagarwala | H02J 1/10 307/43 |
| 2003/0085622 A1* | 5/2003 | Hailey | G06F 1/263 307/52 |
| 2009/0167087 A1* | 7/2009 | Clemo | H02J 1/102 307/43 |
| 2011/0314318 A1* | 12/2011 | Sawai | H05K 7/1498 713/340 |
| 2015/0309522 A1* | 10/2015 | Fang | G05B 15/02 700/22 |

* cited by examiner

*Primary Examiner* — Thienvu Tran
*Assistant Examiner* — David M Stables
(74) *Attorney, Agent, or Firm* — Harrity & Harrity, LLP

(57) ABSTRACT

A system may include a power source selector device connected to a plurality of power sources. The system may also include multiple power supply modules (PSMs). A first PSM, of the multiple PSMs, may be connected to a first output of the power source selector device. A second PSM, of the multiple PSMs, may be connected to a second output of the power source selector device. The first output of the power source selector device may be different from the second output of the power source selector device. The system may also include a controller device connected to the power source selector device and each of the multiple PSMs.

20 Claims, 8 Drawing Sheets

BALANCING AN ELECTRICAL LOAD, ASSOCIATED WITH POWER SUPPLY MODULES OF AN N+A POWER SUPPLY SYSTEM, BETWEEN POWER SOURCES

BACKGROUND

A power supply module (PSM) is an electronic device that supplies electric energy to an electrical load. A purpose of the PSM may be to convert one form of electrical energy to another form of electrical energy. The PSM may be a discrete device or may be built into another device (e.g., a powered system), such as a PSM included in a desktop computer, a consumer electronics device, a network device, or the like. The powered system may have multiple PSMs to supply power, from different power sources, to multiple electrical loads associated with multiple components of the powered system. The device may also have one or more backup PSMs in case of a failure by a PSM.

SUMMARY

According to some possible implementations, a device may comprise one or more processors to: receive one or more inputs for determining a default power source for a power supply module (PSM) of a plurality of PSMs, where a total quantity of the plurality of PSMs is less than double a required quantity of PSMs needed to power a powered system, and where the one or more inputs include at least one of: quantity information that identifies a quantity of PSMs powering the powered system, power characteristic information that identifies a plurality of input voltage levels or a plurality of input current levels corresponding to the plurality of PSMs, or user input associated with the PSM; determine the default power source, from a plurality of power sources, for the PSM based on the one or more inputs; and set the default power source for the PSM based on determining the default power source to permit the default power source to supply power to the PSM.

According to some possible implementations, a system may comprise a power source selector device connected to a plurality of power sources; a plurality of power supply modules (PSMs), a first PSM, of the plurality of PSMs, being connected to a first output of the power source selector device, and a second PSM, of the plurality of PSMs, being connected to a second output of the power source selector device, the first output of the power source selector device being different from the second output of the power source selector device; and a controller device connected to the power source selector device and each of the plurality of PSMs.

According to some possible implementations, a method may comprise: receiving, by a device, one or more inputs for determining a default power source for a power supply module (PSM) of a plurality of PSMs included in a powered system, a total quantity of the plurality of PSMs being less than double a required quantity of PSMs needed to power the powered system, and the one or more inputs including power characteristic information identifying input voltage levels and/or input current levels corresponding to the plurality of PSMs; identifying, by the device, the default power source, from a plurality of power sources, for the PSM based on the one or more inputs; and setting, by the device, the default power source for the PSM based on determining the default power source.

DETAILED DESCRIPTION

Figure 1:
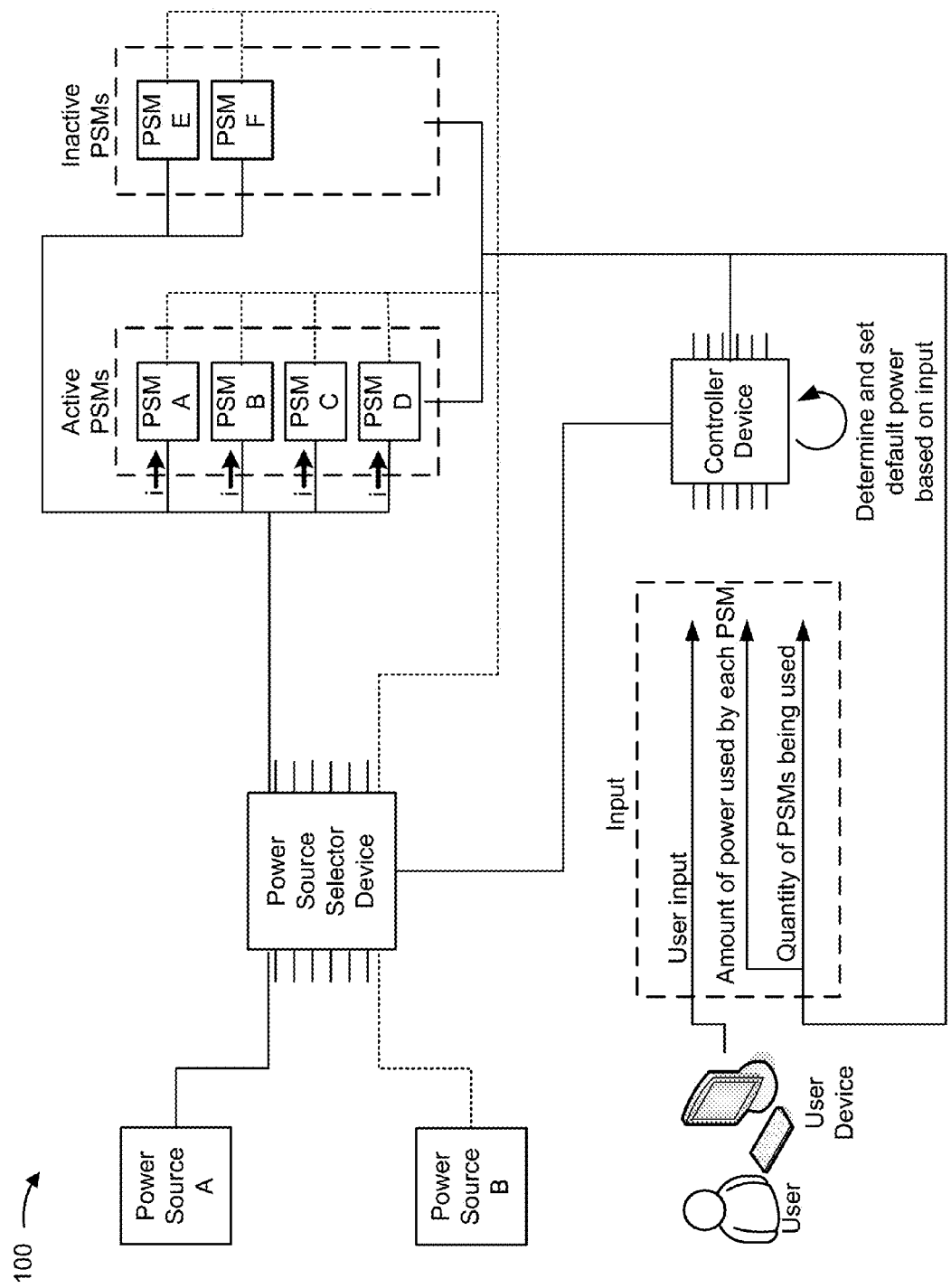
FIG. 1 is a diagram of an overview of an example implementation described herein.

The following detailed description of example implementations refers to the accompanying drawings. The same reference numbers in different drawings may identify the same or similar elements.

A powered system may have one or more power sources (e.g., having two or more power sources is a common practice) powering multiple power PSMs) to supply power to multiple electrical loads associated with multiple components of the powered system. The powered system may also have one or more backup PSMs in case of a failure by a PSM. Each PSM may have inputs from each power source, in case of a failure by a power source.

The powered system may have different configurations of PSMs (e.g., different power supply systems), depending on a quantity of required PSMs (e.g., a required quantity of PSMs needed to power the system) and a quantity of backup PSMs. For example, if the powered system has an N+N power supply system, then the quantity of required PSMs (N) is equal to the quantity of backup PSMs (N). So, in an N+N power supply system, there would be a backup PSM for each required PSM. For example, if there were three required PSMs (e.g., N=3), then there would be three required PSMs and three backup PSMs, for a total of six PSMs (e.g., N+N=6). Powered systems with an N+A power supply system (where A is an integer, and 0<A<N) have N required PSMs and A backup PSMs. For example, in an N+1 power supply system, there would be one backup PSM for the powered system, which has N required PSMs. In an N+2 power supply system, there are 2 backup PSMs for the powered system, which has N required PSMs.

Powered systems with an N+N power supply system may be configured so that a first power source supplies power to half of the active PSMs (e.g., PSMs that are in use by the powered system), while a second power source supplies power to the other half of the active PSMs, since each PSM only has one power source. Powered systems with an N+A power supply system may have PSMs that have inputs from two power sources. However, a manager of a powered system with an N+A (e.g., N+1) power supply system may have no control over which power source is actually supplying power to the PSMs. In an N+A power supply system, the PSM may use the power source with the highest voltage at the PSM. Therefore, in an N+A power supply system, all of the power may be supplied by one power source (e.g., when that power source supplies the highest voltage). Furthermore, if one of the power sources has an oscillating component (e.g., a component of alternating current (AC) not converted by a direct current (DC) power supply), a PSM may switch back and forth between power sources as the power source with the highest voltage changes.

Implementations described herein may allow a device of a powered system to determine a default power source for each PSM in an N+A power supply system. The default power source may supply power to a PSM as long as a voltage and/or a current is above a threshold (e.g., as long as the power source is supplying enough power to the PSM). The device may use inputs from the PSMs to set a default power source to balance the electrical load (e.g., an overall electrical load). By allowing the device to determine a default power source for each of the multiple PSMs, the device can properly balance the electrical load on each power source. By balancing the electrical load, the device reduces the chance of overworking or overloading one of the power sources. Furthermore, a balanced electrical load allows for a buffer in case of any changes in power consumption or supply. Finally, the device prevents issues caused when the electrical load switches back and forth between power sources when there is an oscillating component to one of the power sources.

FIG. 1 is a diagram of an overview of an example implementation 100 described herein. As shown in FIG. 1, assume that example implementation 100 includes two power sources, shown as Power Source A and Power Source B. Both Power Source A and Power Source B deliver power to a power source selector device, which delivers power from the power sources to PSMs. As shown, implementation 100 includes six PSMs, including four active PSMs (PSM A, PSM B, PSM C, and PSM D) and two inactive PSMs (PSM E and PSM F). The power source selector device may supply each of the active PSMs with power from Power Source A or Power Source B. The power source selector device may supply zero or more of the PSMs with power from Power Source A and zero or more of the PSMs with power from Power Source B. For example, Power Source A may supply PSM A and PSM B, and Power Source B may supply PSM C and PSM D, thereby balancing an electrical load across the power sources.

As further shown in FIG. 1, assume that a controller device receives input relating to the PSMs and the power sources. The input may include input obtained from the PSMs and/or user input from a user input device, which may guide how the controller device uses the input from the PSMs. The input from the PSMs may identify a quantity of PSMs being used and/or an amount of power used by each PSM. The controller device determines a default power source for the PSMs based on the input. The controller device can set the default power source for the PSMs via the power source selector device.

Implementations described herein may allow a controller device to determine a default power source for each PSM in an N+A power supply system using input from the PSMs and/or from a user to set a default power source to balance the electrical load. By allowing the controller device to determine a default power source for each of the multiple PSMs, the controller device can properly balance the electrical load on each power source. By balancing the electrical load, the controller device reduces the chance of overworking or overloading one of the power sources. Furthermore, a balanced electrical load allows for a buffer in case of any changes in power consumption or supply. Finally, the controller device prevents issues caused when the electrical load switches back and forth between power sources when there is an oscillating component to one of the power sources.

Figure 2:
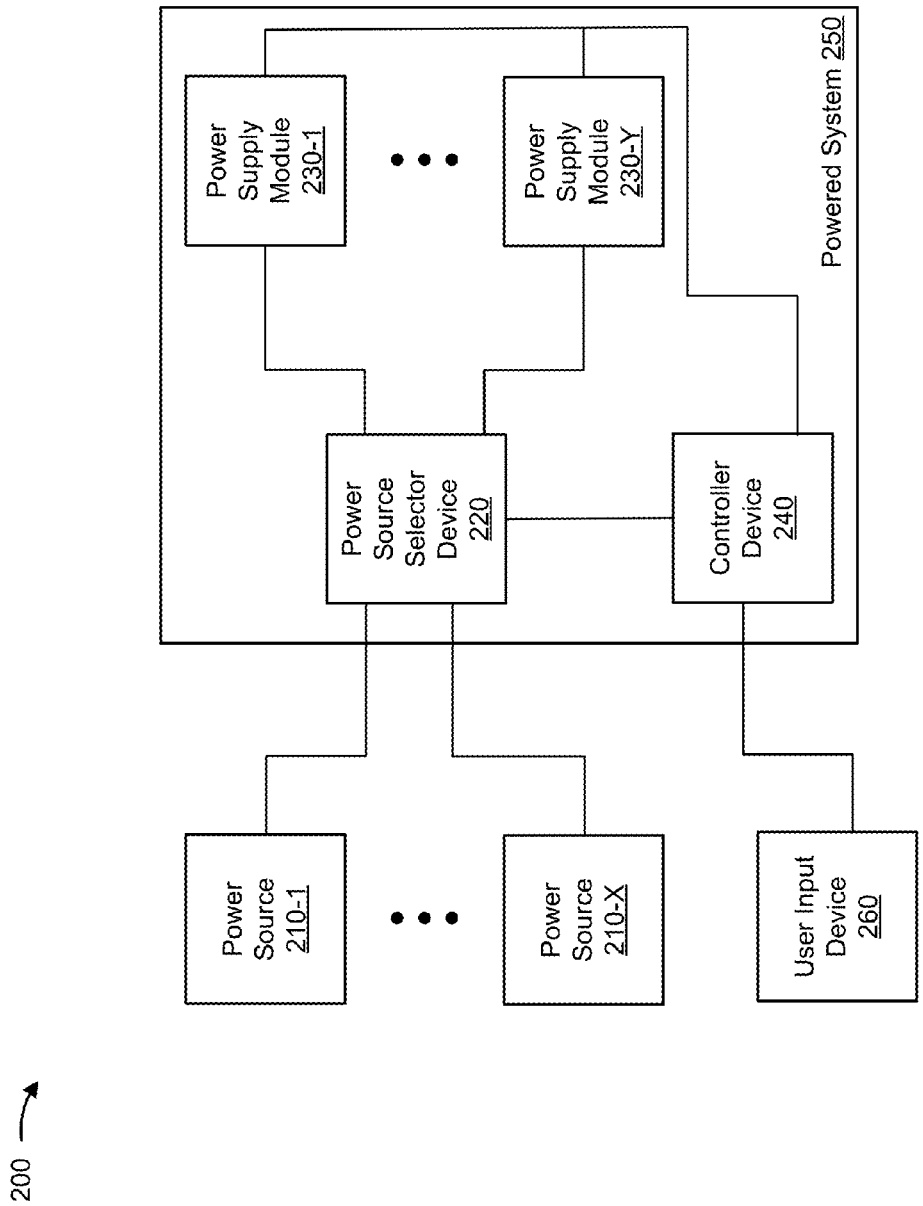
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more power sources 210-1 through 210-X (X>1) (hereinafter referred to collectively as "power sources 210," and individually as "power source 210"), a power source selector device 220, one or more PSMs 230-1 through 230-Y (Y>1) (hereinafter referred to collectively as "PSMs 230," and individually as "PSM 230"), a controller device 240, a powered system 250, and/or a user input device 260. Devices of environment 200 may interconnect via wired connections, wireless connections, or a combination of wired and wireless connections.

Power source 210 may include one or more devices or feeds capable of providing power. For example, power source 210 may include a generator, a rectifier, a battery device (e.g., an uninterruptable power source (UPS), or the like), a feed from a power company, a feed from a power company on a circuit with a circuit breaker, or the like. A first power source 210 may be separate and distinct from a second power source 210 even if the first power source 210 and the second power source 210 receive power from a common power source (e.g., the first power source 210 may be a battery and the second power source may be another battery, both of which receive power from the same feed from an electrical company).

Power source selector device 220 may include one or more devices capable of providing power from multiple power sources 210 to one or more PSMs 230. For example, power source selector device 220 may include a switch, a gate, a chip, or the like. Power source selector device 220 may receive input, from controller device 240, that controls which power source 210, from multiple power sources 210, power source selector device 220 sets to power a particular PSM 230. For example, power source selector device 220 may be configured to power a first group of the one or more PSMs 230 from a first power source 210, and a second group of the one or more PSMs 230 from a second power source 210.

PSM 230 may include a PSM that includes one or more components associated with managing, controlling, monitoring, modifying, and/or adjusting an amount of power associated with powered system 250. For example, PSM 230 may include an AC/DC PSM, a DC/DC PSM, or the like. The quantity of PSMs may be N+A if powered system 250 is a N+A power supply system. An N+A power supply system (where N and A are integers, and 0<A<N), has N required PSMs 230 and A backup PSMs 230 as described herein.

Controller device 240 may include one or more devices capable of determining a default power source 210 for PSM 230 and setting the default power source 210 using power source selector device 220. For example, controller device 240 may be a server, a microcontroller, a chip, a circuit, or the like. In some implementations, controller device 240 may receive user input directly from user input device 260. The user input may aid controller device 240 in determining a default power source 210 for PSM 230.

Powered system 250 may include one or more devices that are to be powered via PSMs 230. For example, powered system 250 may include a user device (e.g., a desktop computer, a laptop computer, a mobile device, a gaming device, etc.), a network device (e.g., a router, a gateway, a firewall, a server, an access point, etc.), an appliance, a vehicle, a piece of industrial equipment, or another type of device. In some implementations, powered system 250 may include multiple PSMs 230.

User input device 260 may include one or more devices capable of receiving, generating, storing, processing, and/or providing information associated with power source 210 and PSM 230. For example, user input device 260 may include a computing device, such as a server, a mobile phone (e.g., a smart phone, a radiotelephone, etc.), a laptop computer, a tablet computer, a handheld computer, or a similar type of device.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
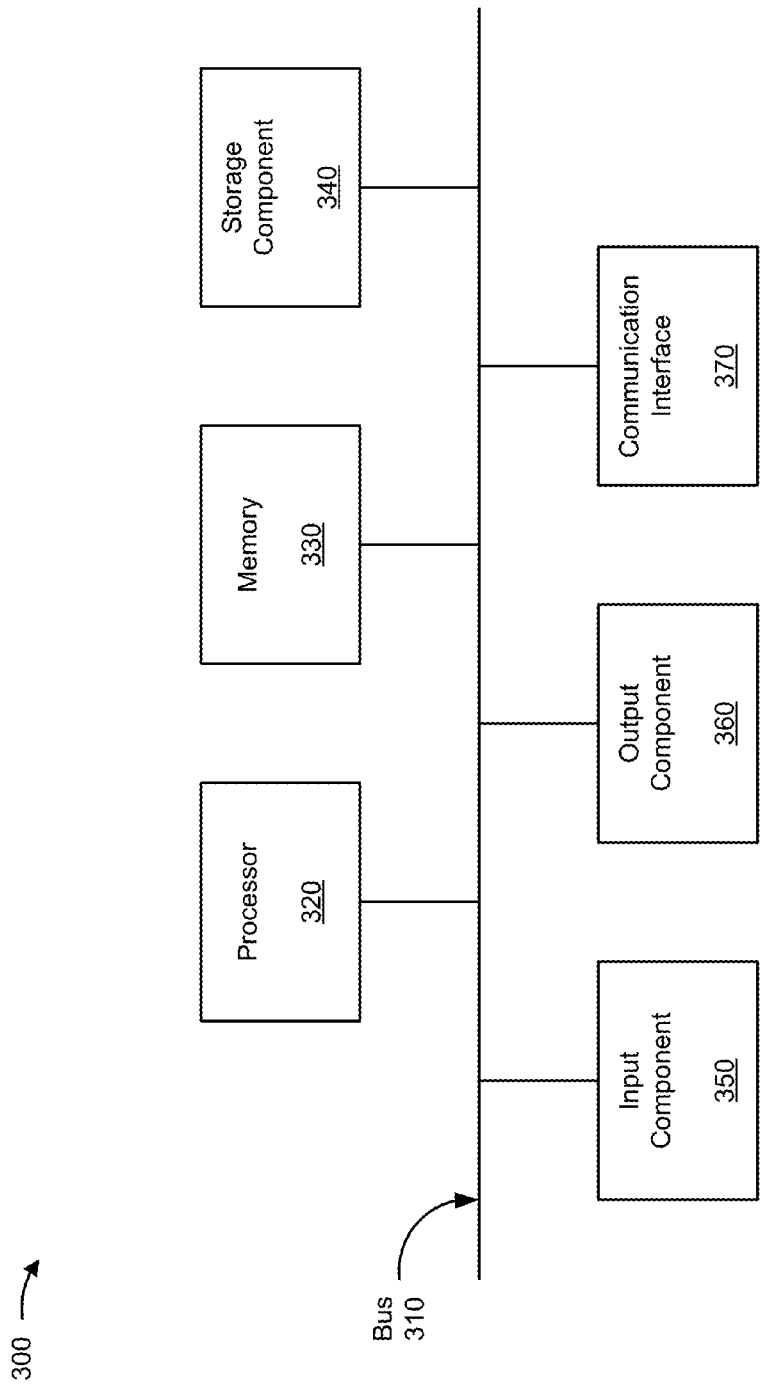
FIG. 3 is a diagram of example components of one or more devices of FIG. 2.

FIG. 3 is a diagram of example components of a device 300. Device 300 may correspond to power source selector device 220, controller device 240, powered system 250 and/or user input device 260. In some implementations, power source selector device 220, controller device 240, powered system 250, and/or user input device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
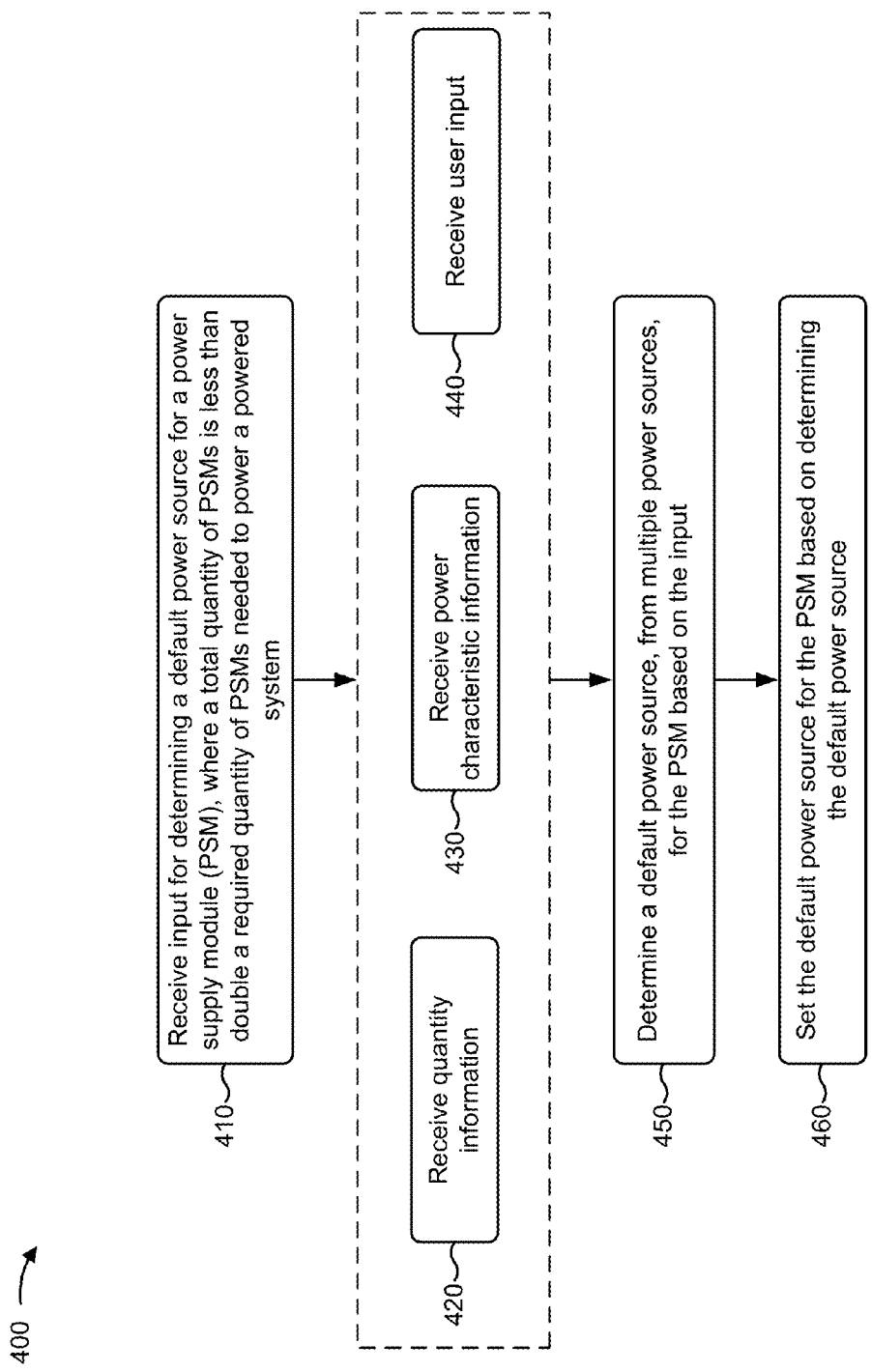
FIG. 4 is a flow chart of an example process for balancing an electrical load, associated with PSMs, between power sources.

FIG. 4 is a flow chart of an example process 400 for balancing an electrical load, associated with PSMs, between power sources. In some implementations, one or more process blocks of FIG. 4 may be performed by controller device 240. In some implementations, one or more process blocks of FIG. 4 may be performed by another device or a group of devices separate from or including controller device 240, such as power source selector device 220, PSM 230, powered system 250, and/or user input device 260.

As shown in FIG. 4, process 400 may include receiving input for determining a default power source for a power supply module (PSM), where a total quantity of PSMs is less than double a required quantity of PSMs needed to power a powered system (block 410). For example, controller device 240 may receive input for determining a default power source 210 for a PSM 230. Controller device 240 may receive the input via connections to PSM(s) 230 and/or user input device 260. The input is described in further detail below.

In some implementations, a default power source 210 is a power source 210 that supplies power to a particular PSM 230 as long as a voltage being supplied to the particular PSM 230 from the default power source 210 satisfies a first threshold and/or current being supplied to the particular PSM 230 from the default power source 210 satisfies a second threshold. In some implementations, the first threshold and/or the second threshold may be associated with a time threshold (e.g., in cases where power source 210 provides AC power or a component of AC power). To satisfy the time threshold, the first threshold, and/or the second threshold may be satisfied for at least the time threshold. A standby power source 210 is a power source 210 that supplies power to a PSM 230 when the voltage from the default power source 210 does not satisfy the first threshold and/or the current from the default power source 210 does not satisfy the second threshold. In other words, when the default power source 210 is capable of providing the power needed for a PSM 230, PSM 230 may use the default power source 210. When the default power source 210 is not capable of providing the power needed for a PSM 230, PSM 230 may use the standby power source 210.

In some implementations, powered system 250 may have multiple PSMs 230. In these instances, controller device 240 may determine a default power source for each of the multiple PSMs 230.

In some implementations, a total quantity of PSMs 230 may include all PSMs 230 associated with powered system 250. PSMs 230 that are supplying power to powered system 250 may be referred to as active PSMs 230, and PSMs 230 that are not supplying power to powered system 250 may be referred to as inactive PSMs 230.

Additionally, or alternatively, a required quantity of PSMs 230 may include active PSMs 230 needed to power powered system 250 when powered system 250 is utilizing as many PSMs 230, to provide power, as powered system 250 is able to utilize at a given time (e.g., when powered system 250 is performing a maximum number of tasks, or operating at a maximum power level). Any PSM 230 not being utilized by powered system 250 when powered system 250 is utilizing as many PSMs 230 as powered system is able to utilize at a given time may be referred to as a backup PSM 230. A backup PSM 230 may differ from an inactive PSM 230, because the inactive PSM 230 is a PSM 230 not being utilized at a given time (not just when the system is performing a maximum number of tasks) and may include a required PSM 230 or a backup PSM 230. In other words, a backup PSM 230 may generally be an inactive PSM 230 (e.g., provided the required PSMs 230 are functional), but an inactive PSM 230 may not generally be a backup PSM 230.

In some implementations, controller device 240 may determine the default power source 210 for a PSM 230, where the total quantity of PSMs 230 is less than double the required quantity of PSMs 230 needed to power powered system 250. In other words, there may not be as many backup PSMs 230 as there are required PSMs 230. An N+N system has N active PSMs 230 and N backup PSMs 230. Therefore, powered system 250 may not be provided power by an N+N power supply system. Powered system 250 may be provided power by an N+A power supply system (where N and A are integers, and 0<A<N), because an N+A power supply system has N required PSMs 230 and A backup PSMs 230.

As further shown in FIG. 4, process 400 may include receiving quantity information associated with the PSMs (block 420). For example, controller device 240 may receive quantity information, associated with the active PSMs 230 (e.g., the PSMs 230 being used) of powered system 250, as an input. The quantity information may include a quantity of active PSMs 230. Additionally, or alternatively, the quantity information may include information that identifies the active PSMs 230 (rather than just a quantity of active PSMs 230). Controller device 240 may determine which PSMs 230 are active via a connection that controller device 240 has with the PSMs 230 associated with powered system 250 (e.g., controller device 240 may monitor inputs to PSMs 230). Controller device 240 may determine whether a PSM 230 is active by determining whether a voltage level associated with an input of PSM 230 satisfies a first threshold or a current level associated with an input of PSM 230 satisfies a second threshold. Additionally, or alternatively, the quantity information may identify the inactive PSMs 230, in addition to the active PSMs 230, to determine a total quantity of PSMs 230 and the quantity of active PSMs 230.

As further shown in FIG. 4, process 400 may include receiving power characteristic information associated with the PSMs (block 430). For example, controller device 240 may receive power characteristic information, associated with PSMs 230 of powered system 250, as an input. Controller device 240 may receive separate power characteristic information for each PSM 230 and may receive the power characteristic information from the PSMs 230 and/or from power source selector device 220.

In some implementations, the power characteristic information may include information identifying an input voltage level and/or an input current level for PSM 230. Additionally, or alternatively, the power characteristic information may identify a power source 210 associated with the input voltage and/or the input current for PSM 230.

As further shown in FIG. 4, process 400 may include receiving user input (block 440). For example, controller device 240 may receive user input, from user input device 260, as an input. In some implementations, user input device 260 may provide, for display (e.g., on a user interface), the quantity information and/or the power characteristic information of PSMs 230, and may allow the user of user input device 260 to select a default power source 210 for PSM 230 and/or set the first threshold associated with a voltage and/or a second threshold associated with a current (e.g., the default power source 210 needing to satisfy the first threshold and/or the second threshold in order to be used). In some implementations, the user input may not include a selection for the default power source 210 but instead may provide a parameter for the selection of default power source 210. For example, the parameter may be associated with the power characteristic information associated with PSMs 230, may be associated with quantity information, or the like. For example, the user input may include a request to have a first power source 210 provide 75% of the power to powered system 250 and a second power source 210 provide 25% of the power to powered system 250.

As further shown in FIG. 4, process 400 may include determining a default power source, from multiple power sources, for the PSM based on the input (block 450). For example, controller device 240 may determine a default power source 210, from multiple power sources 210 (e.g., two power sources 210), for the PSM 230. Powered system 250 may be provided power by multiple power sources 210 so that if one power source 210 fails, another power source 210 may provide power.

In some implementations, controller device 240 may determine the default power source 210 for PSM 230 to balance an overall power used (e.g., the electrical load) between the multiple power sources 210. Balancing the overall power used between multiple power sources 210 is helpful in ensuring that one power source 210 does not get overused, overloaded, or overworked.

Controller device 240 may determine the default power source 210 based on one or more inputs described in connection with blocks 420-440. For example, the input may include the quantity information of the PSMs 230, the power characteristic associated with PSMs 230 of powered system 250, the user input, or the like. Controller device 240 may use a single one of these inputs or any combination of these inputs in determining the default power source 210. For example, in some implementations, controller device 240 may use a weighted combination of these inputs, where the weight assigned to one of the inputs is different than the weight assigned to another one of the inputs.

In some implementations, controller device 240 may use the quantity information to determine the default power source 210 for PSM 230. For example, controller device 240 may determine to assign a first half of active PSMs 230 to a first power source 210 and a second half of active PSMs 230 to a second power source. When the quantity of active PSMs 230 is an odd number, controller device 240 may assign an additional PSM 230 to the first power source 210. Controller device 240 may save processor resources by making the determination for the default power source 210 using the quantity information instead of by more complex criteria.

Additionally, or alternatively, controller device 240 may use the power characteristic information to determine the default power source 210 for PSM 230. For example, in a system with two power sources 210, controller device 240 may attempt to balance electrical loads by balancing a first electrical load (a voltage multiplied by a current) associated with a first power source 210 and a second electrical load associated with a second power source 210 by switching the PSMs 230 as needed to balance the first electrical load and the second electrical load (e.g., so that the first electrical load is within a threshold amount of the second electrical load). Controller device 240 may conserve resources of power source 210 by balancing the electrical loads using the power characteristic information and not overtaxing power source 210.

Additionally, or alternatively, controller device 240 may use user input from user input device 260 to determine the default power source 210 for PSM 230. For example, the user input could be a direct command to use a particular power source 210 as the default power source 210. Additionally, or alternatively, the user input could define one or more parameters in which the quantity information and/or the power characteristic information may be used to determine the default power source 210, as described below. Controller device 240 may give the user more input and thereby save processor resources and resources of power source 210 by allowing the user to input parameters to determine the default power source 210 and balance the electrical loads.

Additionally, or alternatively, controller device 240 may use the user input and the quantity information to determine the default power source 210 for PSM 230. For example, the user input may include a parameter in which the user selects a percentage of PSMs that are to be supplied by a first power source 210 and a percentage of PSMs that are to be supplied by a second power source 210. Controller device 240 may use the parameter from the user input and the quantity information to determine the default power source 210 for PSM 230. As another example, controller device 240 may determine the default power source 210 for PSM 230 based on the quantity information until controller device 240 receives user input that commands controller device 240 to use a different default power source 210.

Additionally, or alternatively, controller device 240 may use the power characteristic information and the user input to determine the default power source 210 for PSM 230. For example, the user input may include a parameter in which the user selects a percentage of the total power that is supplied by a first power source 210 and a percentage of the total power that is supplied by a second power source 210. Controller device 240 may use the parameter from the user input and the power characteristic information to determine the default power source 210 for PSM 230. As another example, controller device 240 may determine the default power source 210 for PSM 230 based on the power characteristic information until controller device 240 receives user input that commands controller device 240 to use a different default power source 210.

Additionally, or alternatively, controller device 240 may use the quantity information and the power characteristic information to determine the default power source 210 for PSM 230. For example, controller device 240 may determine to assign a first half of active PSMs 230 to a first power source 210 and a second half of active PSMs 230 to a second power source, so long as a first electrical load associated with the first power source 210 and a second electrical load associated with a second power source 210 are within a threshold of each other. If the difference between the first electrical load and the second electrical load falls outside the threshold, controller device 240 may determine to balance the electrical loads using the power characteristic information. For example, controller device 240 may attempt to balance electrical loads by balancing the first electrical load from the first power source 210 with the second electrical load from the second power source 210 by switching default power sources 210 for PSMs 230 to evenly balance the first power load and the second power load.

Additionally, or alternatively, controller device 240 may use the quantity information, the power characteristic information, and the user input to determine the default power source 210 for PSM 230. For example, the user input may include a parameter in which the user selects to assign a first half of active PSMs 230 to a first power source 210 and a second half of PSMs 230 to a second power source 210, so long as a first electrical load associated with the first power source 210 and a second electrical load associated with a second power source 210 are within a threshold of each other, as described above. In this implementation, controller device 240 may use all three inputs to determine the default power source 210 for PSM 230.

In some implementations, controller device 240 may determine a default power source 210 for an inactive PSM 230. In this case, the default power source 210 for the inactive PSM 230 may be used when the inactive PSM 230 becomes an active PSM 230 (e.g. a newly active PSM). The default power source 210 for the newly active PSM 230 may change when the newly active PSM 230 becomes an active PSM 230.

By using the input to balance the overall power used between multiple power sources 210, controller device 240 reduces the risk of overloading a power source 210. Furthermore, controller device 240 ensures that a power source 210 is not overworked or overused, thereby prolonging the life of the power source 210.

As further shown in FIG. 4, process 400 may include setting the default power source for the PSM based on determining the default power source (block 460). For example, controller device 240 may set the default power source 210 for PSM 230 based on determining the default power source 210 and by using power source selector device 220. Controller device 240 may set the default power source 210 by sending an instruction to power source selector device 220 to use power source 210 as the default power source 210.

Power source selector device 220 may supply PSM 230 with power from the default power source 210 provided that the voltage satisfies a first threshold and/or the current of default power source 210 satisfies a second threshold (e.g., if the default power source is providing adequate power to power PSM 230). Power source selector device 220 may monitor the voltage and the current to see if the first threshold and/or the second threshold are satisfied, and switch to the standby power source 210 if the first threshold and/or second threshold are not satisfied. PSM 230 may continue to be powered by the default power source 210 until the voltage falls below the first threshold or current falls below the second threshold, or until controller device 240 changes the default power source 210 for PSM 230. In some implementations the first threshold and/or the second threshold may be associated with a time threshold that is satisfied when the first threshold and/or the second threshold are satisfied for at least a time period associated with the time threshold (e.g., the time threshold may be useful when power source 210 has an AC component).

By setting the default power source 210 for the PSM 230 based on determining the default power source 210, controller device 240 reduces the risk of overloading a power source 210. Furthermore, controller device 240 ensures that a power source 210 is not overworked or overused.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
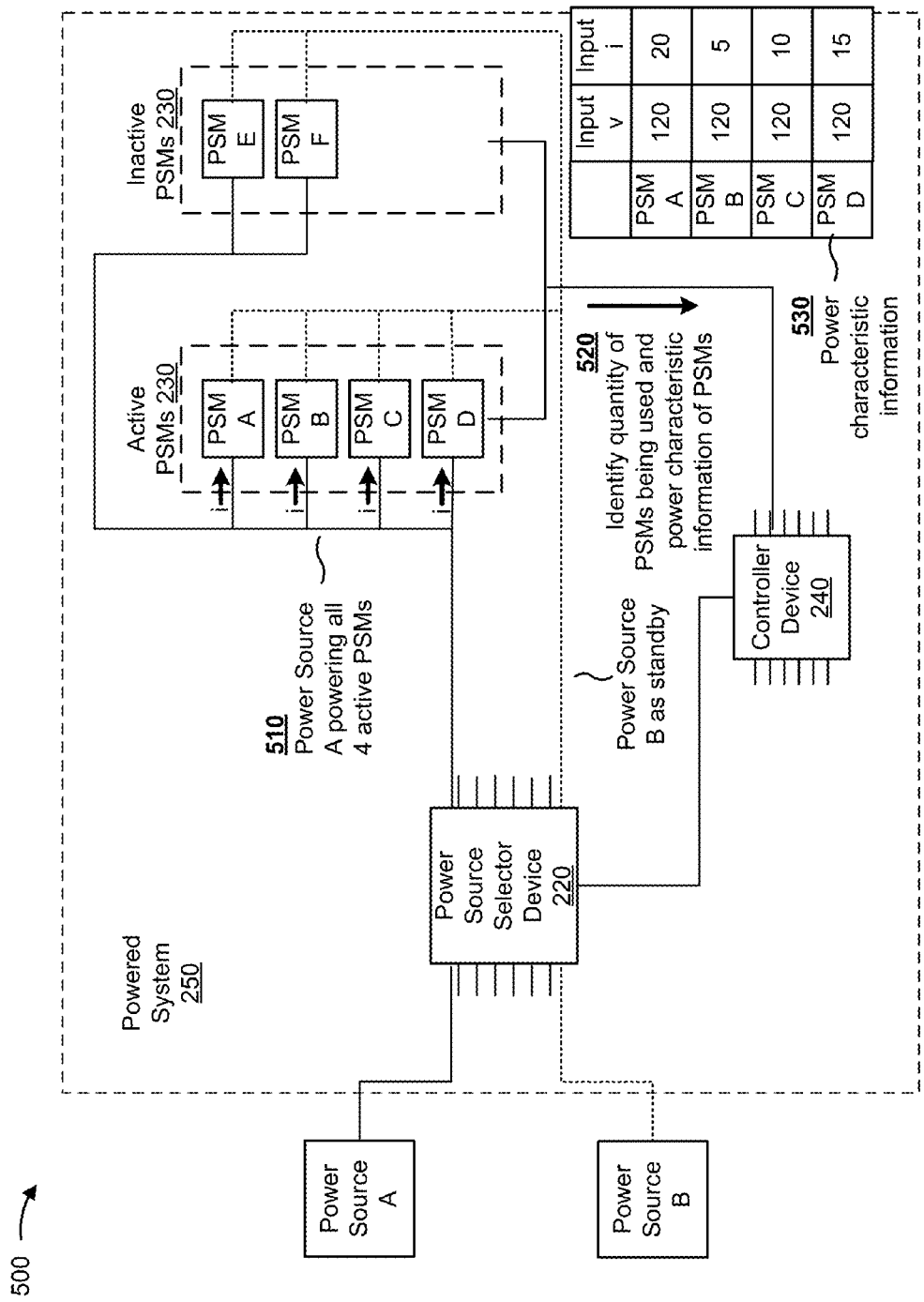
FIGS. 5A and 5B are diagrams of an example implementation relating to the example process shown in FIG. 4.
Figure 5B:
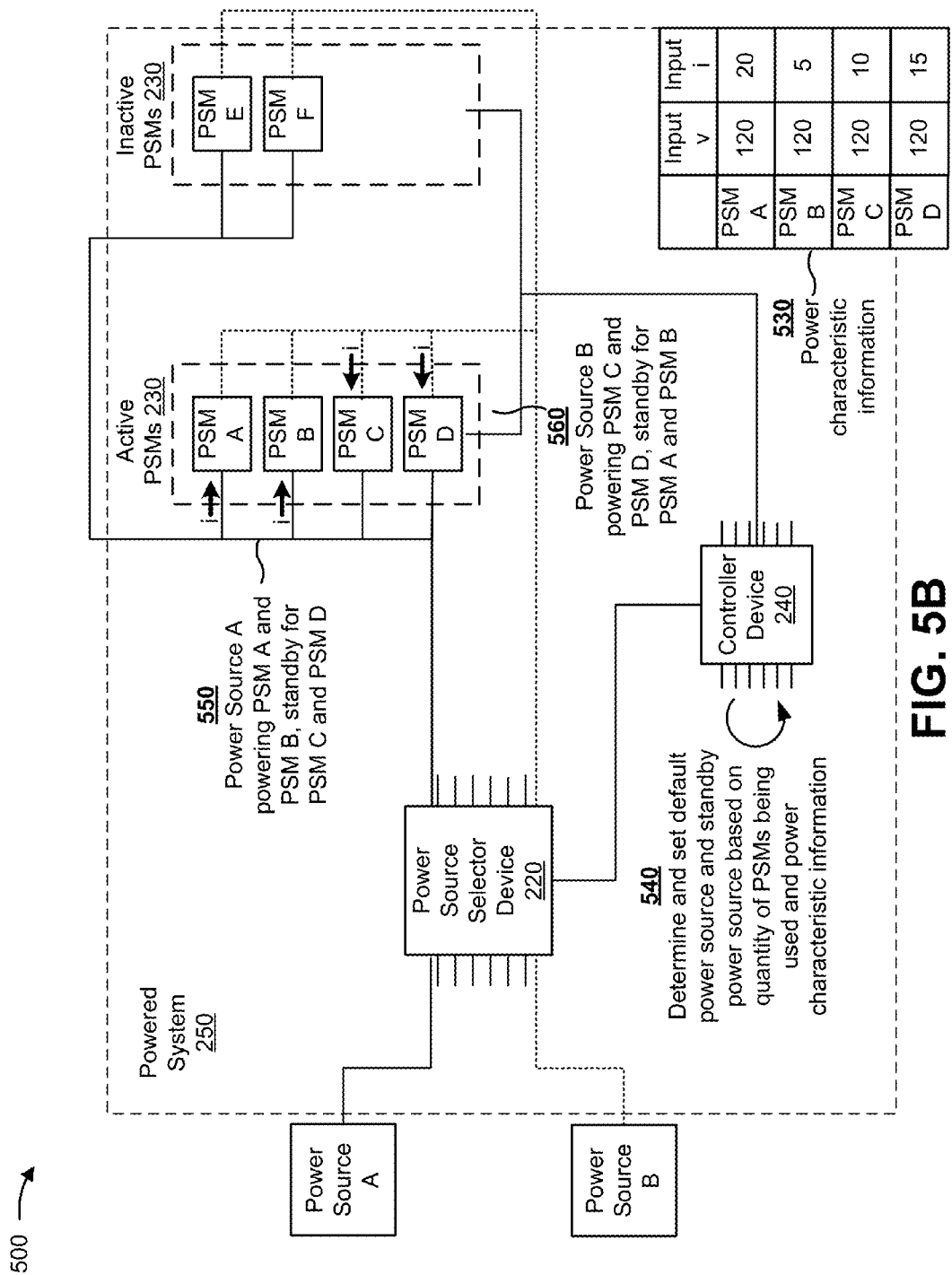

FIGS. 5A and 5B are diagrams of an example implementation 500 relating to example process 400 shown in FIG. 4. FIGS. 5A and 5B show an example of balancing an electrical load, associated with PSMs, between power sources.

As shown in FIG. 5A, assume that two power sources 210 are powering PSMs 230 of powered system 250. The two power sources 210 are shown as Power Source A and Power Source B. There are four active PSMs 230 (PSM A, PSM B, PSM C, and PSM D) and two inactive PSMs 230 (PSM E and PSM F). Power source selector device 220 controls which power source 210 powers the active PSMs 230. As shown by reference number 510, assume that Power Source A is powering all four of the active PSMs 230, and Power Source B is acting as a standby power source 210 (i.e., not powering any of the active PSMs 230 and acting as a backup power source 210 for each of the active PSMs 230). As shown by reference number 520, controller device 240 identifies a quantity of PSMs being used based on power inputs of the PSMs 230, and identifies power characteristic information associated with each PSM 230.

As shown by reference number 530, the power characteristic information includes the input voltage levels and input current levels for each PSM (shown as, "Input v" and "Input i"). The input voltage level of the PSMs is 120 volts. PSM A has an input current level of 20 amps, PSM B has an input current level of 5 amps, PSM C has an input current level of 10 amps, and PSM D has an input current level of 15 amps.

As shown in FIG. 5B, and by reference number 540, controller device 240 determines a default power source 210 and a standby power source 210 for each PSM 230 being used (e.g., the active PSMs 230) based on the quantity of PSMs 230 being used and power characteristic information associated with the PSMs. For example, since the quantity of PSMs being used is four, half (two) can be powered from Power Source A, and half (two) can be powered from Power Source B.

Furthermore, controller device 240 determines that PSM A and PSM B, which have a combined input current level of 25 amps, can be powered by Power Source A, and that PSM C and PSM D, which also have a combined input current level of 25 amps, can be powered by Power Source B. Controller device 240 chooses to pair PSM A with PSM B and to pair PSM C with PSM D over other combinations that would not evenly balance the current and the electrical load (e.g., a difference between the electrical loads and/or the current would not satisfy a threshold). For example, powering PSM A and PSM D by Power Source A would combine for an input current of 35 amps, and powering PSM B and PSM C by Power Source B would combine for an input current level of 15 amps. The difference of the input current levels may not satisfy a threshold, and therefore controller device 240 may not choose that combination of PSMs.

Controller device 240 sets the default power source 210 and the standby power source 210 for each active PSM 230 by sending signals to power source selector device 220. As shown by reference number 550, Power Source A is now powering PSM A and PSM B (e.g., Power Source A is the default power source 210 for PSM A and PSM B) and Power Source A is the standby power source 210 for PSM C and PSM D. As shown by reference number 560, Power Source B is now powering PSM C and PSM D, and Power Source B is the standby power source 210 for PSM A and PSM B. In this way, controller device 240 has balanced the power load between Power Source A and Power Source B.

As indicated above, FIGS. 5A and 5B are provided merely as an example. Other examples are possible and may differ from what was described with regard to FIGS. 5A and 5B.

Figure 6A:
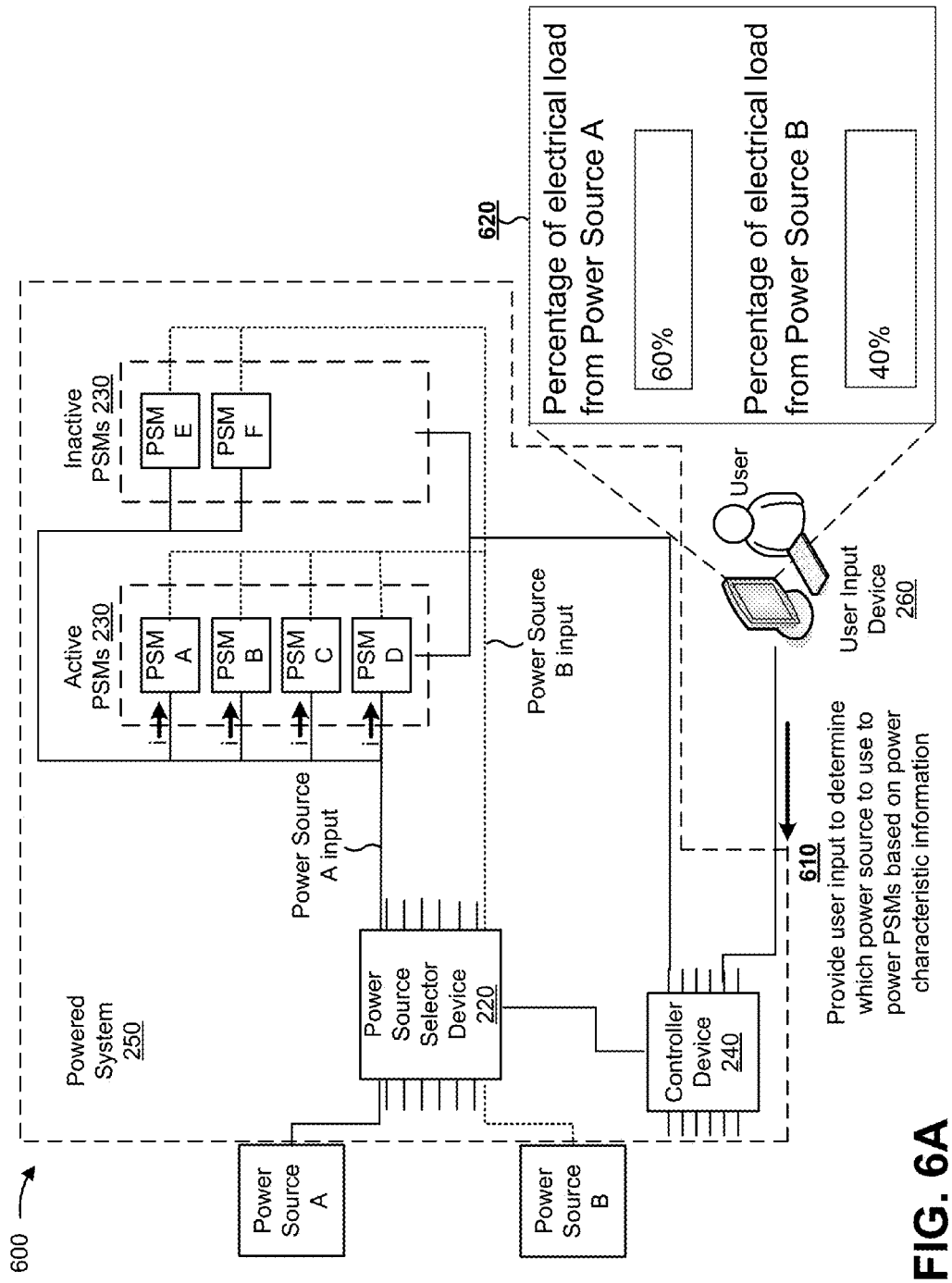
FIGS. 6A and 6B are diagrams of another example implementation relating to the example process shown in FIG. 4.
Figure 6B:
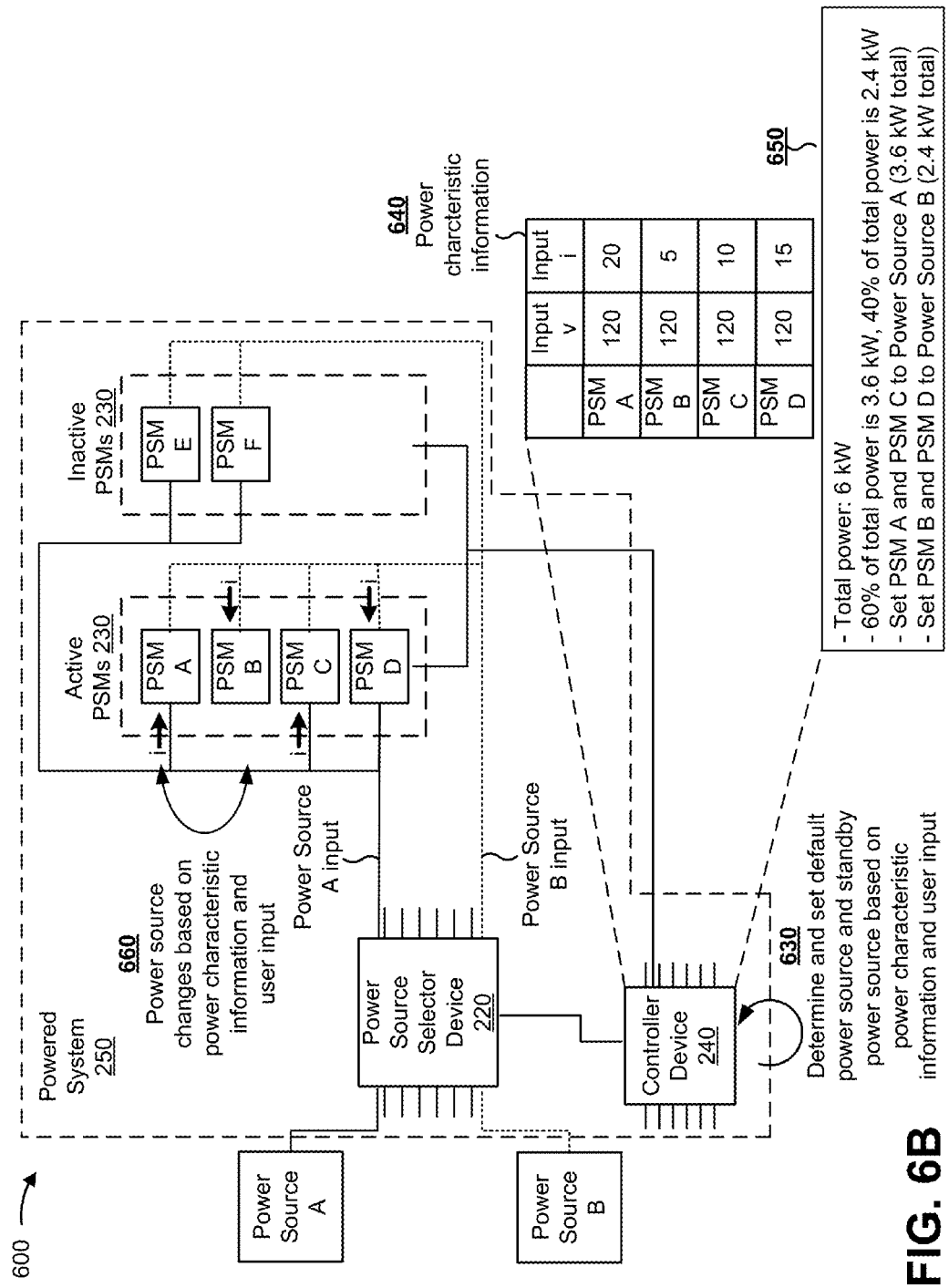

FIGS. 6A and 6B are diagrams of another example implementation 600 relating to example process 400 shown in FIG. 4. FIGS. 6A and 6B show another example of balancing the electrical load, associated with PSMs, between power sources based on power characteristic information and user input.

As shown in FIG. 6A, assume that two power sources 210 are powering PSMs 230 of powered system 250. The two power sources 210 are shown as Power Source A and Power Source B. There are four active PSMs 230 (PSM A, PSM B, PSM C, and PSM D) and two inactive PSMs 230 (PSM E and PSM F). Power source selector device 220 controls which power source 210 powers the active PSMs 230. Assume that Power Source A is powering all four of the active PSMs 230. As shown by reference number 610, user input device 260 provides user input to determine which power source to use to power the PSMs based on power characteristic information. As shown by reference number 620, the user input includes criteria set by a user that indicates that Power Source A should handle 60% of the electrical load and that Power Source B should handle 40% of the electrical load.

As shown in FIG. 6B, and by reference number 630, controller device 240 determines and sets the default power source 210 and the standby power source 210 based on power characteristic information and the user input that included the criteria. As shown by reference number 640, the power characteristic information includes the input voltage level and input current level for each PSM. The input voltage level of the PSMs is 120 volts. PSM A has an input current level of 20 amps, PSM B has an input current level of 5 amps, PSM C has an input current level of 10 amps, and PSM D has an input current level of 15 amps.

As shown by reference number 650, controller device 240 determines the total power consumed by the PSMs to be 6 kilowatts (kW), which is a sum of the input current levels (20+5+10+15=50 amps) multiplied by the input voltage level (120 volts). Controller device 240 also determines that 60% of the electrical load (e.g., a desired electrical load for Power Source A based on the user input) is 3.6 kW and that 40% of the electrical load (e.g., a desired electrical load for Power Source B based on the user input) is 2.4 kW. Controller device 240 determines that PSM A and PSM C should be powered by Power Source A because the combined power of PSM A and PSM B is 3.6 kw (30 amps*120 volts), and that PSM B and PSM D should be powered by Power Source B because the combined power of PSM B and PSM D is 2.4 kw.

As shown by reference number 660, the power source 210 powering the active PSMs 230 changes based on the power characteristic information and the user input. Power Source A is now powering PSM A and PSM C, while Power Source B is now powering PSM B and PSM D. Controller device 240 instructed power source selector device 220 to change the default power sources 210 in accordance with the user input. By allowing user input and the power characteristic information to control the default power source 210 of the PSMs 230, the electrical load can be more appropriately balanced according to characteristics associated with each power source 210, so that the power sources 210 are not overworked or in danger of overuse.

As indicated above, FIGS. 6A and 6B are provided merely as an example. Other examples are possible and may differ from what was described with regard to FIGS. 6A and 6B.

Implementations described herein may allow a controller device to determine a default power source for each PSM in an N+A power supply system using inputs from the PSMs and/or from a user to set a default power source to balance the electrical load. By allowing the controller device to determine a default power source for each of the multiple power supplies, the controller device can properly balance the electrical load on each power source and may give more control to the user. By balancing the electrical load, the controller device reduces the chance of overworking or overloading one of the power sources. Furthermore, a balanced electrical load allows for a buffer in case of any changes in power consumption or supply. Finally, the controller device prevents issues where the electrical load is switching back and forth between power sources when there is an oscillating component to one of the power sources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive two or more inputs for determining a default power source for a power supply module (PSM) of a plurality of PSMs,
   where a total quantity of the plurality of PSMs is less than double a required quantity of PSMs needed to power a powered system, and
   where the two or more inputs include:
   user input associated with the PSM, and at least one of:
   quantity information that identifies a quantity of PSMs powering the powered system, or
   power characteristic information that identifies a plurality of input voltage levels or a plurality of input current levels corresponding to the plurality of PSMs;
   determine the default power source, from a plurality of power sources, for the PSM based on the two or more inputs;
   set the default power source for the PSM based on determining the default power source to permit the default power source to supply power to the PSM; and send an instruction to another device to power the PSM from the default power source,
the default power source being changeable between the plurality of power sources based upon a change in the two or more inputs.

2. The device of claim 1, where the two or more inputs include the power characteristic information,
where the one or more processors, when determining the default power source, are to:
determine the default power source for the PSM based on the power characteristic information that identifies the plurality of input voltage levels or the plurality of input current levels corresponding to the plurality of PSMs.

3. The device of claim 1, where the two or more inputs include the quantity information,
where the one or more processors, when determining the default power source, are to:
determine the default power source for the PSM based on the quantity information that identifies the quantity of PSMs powering the powered system.

4. The device of claim 1, where the two or more inputs include the power characteristic information and the user input,
where the one or more processors, when determining the default power source, are to:
determine the default power source for the PSM based on the power characteristic information and the user input.

5. The device of claim 1, where the two or more inputs include the power characteristic information, the quantity information, and the user input,
where the one or more processors, when determining the default power source, are to:
determine the default power source for the PSM based on the power characteristic information, the quantity information, and the user input.

6. The device of claim 1, where the one or more processors when determining the default power source, are to:
receive the power characteristic information based on monitoring the plurality of input voltage levels and the plurality of input current levels; and
determine the default power source based on the power characteristic information and monitoring the plurality of input voltage levels and input current levels.

7. The device of claim 1, where the one or more processors, when setting the default power source, are to:
permit the default power source to power the PSM as long as an input voltage level, for the PSM, satisfies a first threshold and input current level, for the PSM, satisfies a second threshold.

8. A system comprising:
a power source selector device connected to a plurality of power sources;
a plurality of power supply modules (PSMs),
a first PSM, of the plurality of PSMs, being connected to a first output of the power source selector device, and
a second PSM, of the plurality of PSMs, being connected to a second output of the power source selector device,
the first output of the power source selector device being different from the second output of the power source selector device; and
a controller device connected to the power source selector device and each of the plurality of PSMs,
the controller device is to:
receive two or more inputs for determining a default power source for a PSM of the plurality of PSMs,
where the two or more inputs include:
user input associated with the PSM, and at least one of:
quantity information that identifies a quantity of PSMs powering the system, or
power characteristic information that identifies a plurality of input voltage levels or a plurality of input current levels corresponding to the plurality of PSMs;
determine the default power source, from the plurality of power sources, for the PSM based on the two or more inputs;
set the default power source for the PSM based on determining the default power source to permit the default power source to supply power to the PSM; and
send an instruction to the power source selector device to power the PSM from the default power source,
the default power source being changeable between the plurality of power sources based upon a change in the two or more inputs.

9. The system of claim 8, where the controller device is to:
determine the default power source, from the plurality of power sources, for the PSM, of the plurality of PSMs, based on the quantity information; and
set the default power source for the PSM based on determining the default power source.

10. The system of claim 9,
where the controller device, when determining the default power source, is to:
determine the default power source based on the power characteristic information and the quantity information.

11. The system of claim 9, where
the controller device, when determining the default power source, is to:
determine the default power source based on the user input and the quantity information.

12. The system of claim 8, where the controller device is further to:
determine the default power source for the PSM based on the power characteristic information.

13. The system of claim 8, where a total quantity of the plurality of PSMs is less than double a required quantity of PSMs needed to power the system.

14. The system of claim 8, where the controller device is further connected to a user input device.

15. The system of claim 8, where the controller device is further to:
permit the default power source to power the PSM as long as an input voltage level, for the PSM, satisfies a first threshold and input current level, for the PSM, satisfies a second threshold.

16. A method, comprising:
receiving, by a device, two or more inputs for determining a default power source for a power supply module (PSM) of a plurality of PSMs included in a powered system,
a total quantity of the plurality of PSMs being less than double a required quantity of PSMs needed to power the powered system, and
the two or more inputs including power characteristic information identifying input voltage levels and/or input current levels corresponding to the plurality of PSMs and a user input associated with the PSM;

identifying, by the device, the default power source, from a plurality of power sources, for the PSM based on the two or more inputs;

setting, by the device, the default power source for the PSM based on determining the default power source; and sending, by the device, an instruction to another device to power the PSM from the default power source, the default power source being changeable between the plurality of power sources based upon a change in the two or more inputs.

17. The method of claim 16, where the two or more inputs further include quantity information associated with one or more PSMs, of the plurality of PSMs, powering the powered system, the quantity information identifying a quantity of the one or more PSMs.

18. The method of claim 16, where the two or more inputs further include user input based on a user interaction with a user interface.

19. The method of claim 16, where identifying the default power source comprises:

identifying the default power source for the PSM to balance an electrical load for each of the plurality of power sources within a threshold amount.

20. The method of claim 16, where setting the default power source comprises:

permitting the default power source to power the PSM as long as an input voltage level, for the PSM, satisfies a first threshold and input current level, for the PSM, satisfies a second threshold.

* * * * *